May 11, 1926.

R. J. RICHEY

ROAD MAP HOLDER

Filed Feb. 2, 1925

1,583,998

Witness
Louis McClain

Inventor
Ralph J. Richey
By Dair Freeman & Latta Attys

Patented May 11, 1926.

1,583,998

UNITED STATES PATENT OFFICE.

RALPH J. RICHEY, OF SIOUX CITY, IOWA.

ROAD-MAP HOLDER.

Application filed February 2, 1925. Serial No. 6,187.

My invention relates to a road map holder to be used in an automotive vehicle of the type in which the map is rolled upon a spring-actuated roller within a suitable enclosing casing. An object of my invention is to provide such a holder of simple, durable and inexpensive construction.

More particularly, it is my object to provide a map holder of the spring roller type, in which the map itself is readily removable from the holder.

The foregoing object is preferably carried out by providing a flexible holding sheet adapted to be wound upon a spring roller, and having at its free end a pocket in which one edge of a map may be inserted, the other edge of the map being firmly secured, when in place, between the holding sheet and the roller, and the pocket being of such depth as to allow longitudinal movement of the end of the map received therein to prevent buckling of the map while being rolled around the roller.

Another object is to provide a roller casing having certain novel features of construction.

With these and other objects in view, my invention consists in the construction, arrangement and combination of the various parts of my device, whereby the objects contemplated are attained, as hereinafter more fully set forth, pointed out in my claims and illustrated in the accompanying drawings, in which:

Flig. 4 is an end view of the roller, the casing not being shown.

Figure 5:
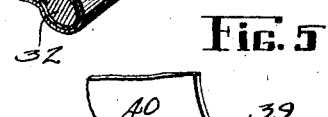

Fig. 5 is a perspective view of a portion of the end of the casing.

The advantages of the ordinary spring roller map as applied to use for a road map for automotive vehicles are several. It occupies a minimum of space and may be brought into opertive position by one hand of the driver while the other is upon the steering wheel.

I am aware that others have invented road maps of this type to be used with automotive vehicles, but so far as I am aware none of them provide for the ready removal and insertion of the different maps upon a holding device, whereby the same device may be used in any section of the country through which the tourist may be passing. My invention is primarily devoted to the attaining of this object.

In carrying out my invention I provide a tubular casing, 10, having the end members, 11 and 12, removably secured in the ends thereof by means of screws, 13, and provided with brackets, 14, by means of which the casing may be secured to a dash, 15, of a vehicle or in any other convenient position, such as above the left front door thereof or above the windshield. The member, 11, is provided with a slot, 16, and the member 12 with a round hole, 17, to receive, respectively, the squared end, 18, and rounded end, 19, of a spring-actuated roller, which I will designate generally by the reference numeral, A, and which is similar to the ordinary spring roller used in window blinds and the like.

The roller, A, has the outer hollowed roller member, 20, and the inner shaft, 21, between which is received a spiral spring, 22, secured at 23, in the roll, 20, and at 24 in the shaft, 21.

Formed on the end of the shaft, 21, are the ratchet slots, 25, and co-acting therewith are the pawls, 26, pivoted on the end of the roller, 20. The construction described is of the ordinary construction and has not been given detailed consideration for that reason.

Figure 1:
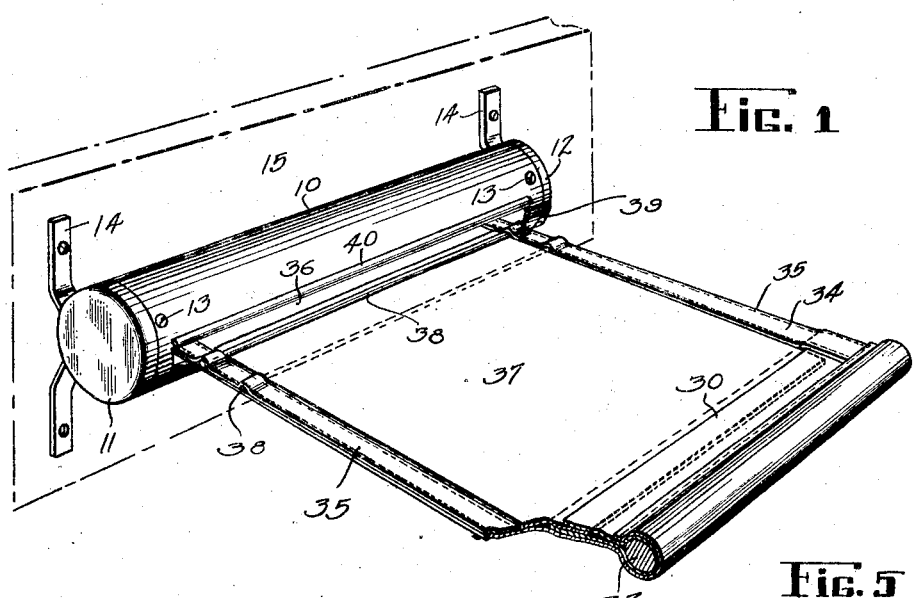
Fig. 1 is a perspective view of the holder installed on an instrument board or dash of a car.

The pawls may or may not be used, especially when the holder is mounted in the position shown in Fig. 1.

I provide a flexible holding sheet, 25, which may be of fabric or composition, and which is secured at one end to a flattened face formed on the roller, as at 26, by means of a thin metallic strip, 27, secured over the end of the sheet by means of a thin-headed screw, 28.

Figure 2:
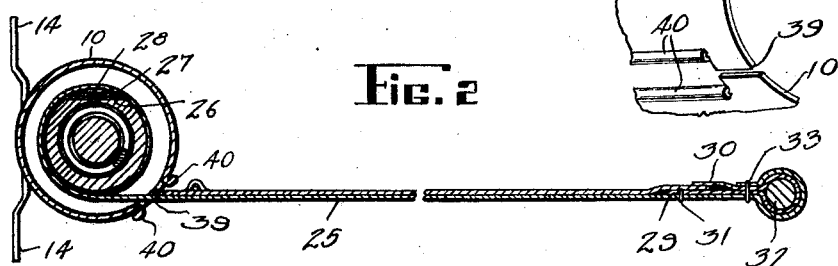
Fig. 2 is a sectional view of the same taken transversely through the roller.
Figure 3:
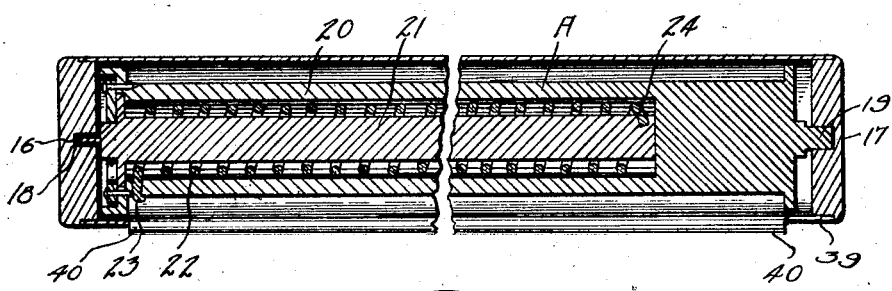
Fig. 3 is a sectional view of the same taken longitudinally through the roller, the map holding sheet not being shown.
Figure 4:
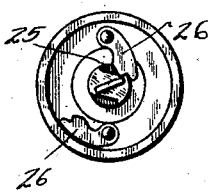

The free end of the holding sheet, 25, is provided with a pocket formed of a sheet of semi-stiff material such as celluloid, which is doubled upon itself to form the lower flap, 29, and the upper flap, 30. The lower flap, 29, extends beyond the upper flap, 30, as indicated in Fig. 2, and is sewed at 31 to the sheet, 25. The folded end of the pocket is looped around a stay rod, 32, and the fabric sheet, 25, is extended around the looped por tion of the pocket and sewed upon itself through the two thicknesses of the pocket, as indicated at 33.

To each side edge of the sheet, 25, is secured a binding tape, 34, sewed at each edge as at 35, and the ends of which extend over the ends of the upper pocket flap, 30. It will thus be seen that in addition to binding the edges of the sheet, the tape, 35, will provide a bearing surface to receive the wear of the holding sheet against the edge of the slot, 36, in the casing, 10, and also prevent the edge of the pocket, 30, catching against the edge of the casing. When the sheet, 25, is completely rolled into the casing, the pocket, 30, will also be contained therein. This gives the device a neat appearance in closed position. The tape, 35, may be replaced by the side portions of the sheet, 25, folded back upon itself and stitched.

The map, 37, is inserted under the pocket flap, 30, as indicated in Figs. 1 and 2, and the upper edge thereof allowed to roll between the roller, A, and the holding sheet, 25.

I find from experience that the map, held in this way, will be firmly secured flat against the holding sheet, and as long as a small portion of the upper edge is allowed to remain engaged under the roller, it will maintain its position flat against the holding sheet while the same is rolled in and out of the casing. In so doing it is preferable to leave a small space between the edge of the map and the inner extremity of the pocket, as shown in Figs. 2 and 1, in order that the end of the map may work in and out of the pocket.

It will be seen that there will be a slight tendency of the map to extend itself toward the free end of the holding sheet when it is being rolled into the casing inasmuch as its total circumference, when rolled on the roller, is slightly less than that of the sheet on the outside.

The opposite tendency occurs when the map is unrolled, that is, the end of the map tends to contract away slightly from the end of the holder. By providing a pocket which is of substantial depth and in which the end of the map may be freely received, I find that the map will roll up within the holding sheet without any appreciable tendency to buckle.

The holding sheet may be provided with a rod, 38, preferably of fine steel wire, under which the edge of the map opposite that received in the pocket may be inserted. It will be understood that the holding rod, 38, is not essential to the proper securing of the map in place, but is of advantage where maps of varying sizes are to be used with the holding sheet. If maps of uniform size were to be used the maps would preferably be extended around the roller entirely to the extremity of the holding sheet where it is secured to the roller, and thus even though the holding sheet were drawn out as far as the roller permitted, the end of the map would not leave the casing. However, where varying sizes of maps are used, should this be done, the upper edge of the map would leave the casing and would probably have to be manually reinserted or guided therein in order to return the map into the casing. The tendency of a person using the map would be in many instances to draw the holding sheet out as far as the roller would permit.

The ends of the rod, 38, are secured under the tapes, 35, and thus they are not likely to catch against the edge of the slot, 36. Several of these rods 38 may be used and the map extended over some of the rods and under the rod which is properly positioned to receive it as indicated in Fig. 1.

The casing, 10, is provided with a narrow slot, 39, communicating with the slot, 36, and the end of the casing. By removing the end member, 12, the entire roller and holding sheet may be removed from the casing, the slot, 39, serving to receive the edge of the sheet. The side portions of the casing bordering the slot, 35, are curled outwardly, as at 40, to minimize the wear on the holding sheet.

Some changes may be made in the construction and arrangement of the parts of my invention without departing from the real spirit and purpose of my invention, and it is my intention to cover by my claims any modified forms of structure or use of mechanical equivalents, which may be reasonably included within their scope.

I claim as my invention:

1. In a road map holder, a casing, a spring-actuated roller therein, a flexible holding sheet secured at one end to and adapted to be rolled upon said roller, and a pocket on the free end of the holding sheet positioned on the side of the sheet lying nearest the side of the roller when rolled thereon and adapted to receive the edge of a removable map for supporting the map, the holding sheet being adapted to secure the opposite edge of the map against the roller, and being of such length that the sheet may be unrolled to free the said opposite edge from engagement with the roller to allow ready removal of the map.

2. In a road map holder, a casing, a spring-actuated roller therein, a flexible holding sheet secured at one end to and adapted to be rolled upon said roller, and a pocket on the free end of the holding sheet positioned on the side of the sheet lying nearest the side of the roller when rolled thereon and adapted to receive the edge of a removable map for supporting the map, the holding sheet being adapted to secure the opposite edge of the map against the roller, and being of such length that the sheet may be unrolled to free the said opposite edge from engagement with the roller to allow ready removal of the map, said casing having a longitudinal slot, and said pocket being formed of a piece of stiff material lying flat against the holding sheet and adapted to enter the slot.

3. In a map holder, a casing having a longitudinal slot, a spring-actuated roller therein, a holding sheet secured at one end to said roller, extending through said slot, and adapted to be rolled upon said roller, the free end of the sheet on the side nearest the roller when rolled thereon being provided with a pocket adapted to receive an edge of a map, a stay rod secured to the sheet at its free end, the pocket being formed of a strip of relatively stiff material folded longitudinally, the free end of the holding sheet being extended around the stay rod and securing the folded portions of the pocket upon itself.

4. In a map holder, a casing having a longitudinal slot, a spring-actuated roller therein, a holding sheet secured at one end to the roller, extending through the slot, and adapted to be wound upon the roller, the free end of the sheet on the side nearest the roller when rolled thereon being provided with a pocket formed of a flat strip of material secured thereto and extending from side to side thereof, and binding tapes secured along the side edges of the holding sheet and extending over the ends of said pocket, to facilitate the receiving of said pocket through the slot in the casing.

5. In a map holder, a casing having a longitudinal slot, a spring-actuated roller therein, a holding sheet secured at one end to said roller, extending through said slot, and adapted to be rolled upon said roller, the free end of said sheet being provided with a pocket adapted to receive an edge of a map, and a rod extending transversely of the sheet, secured at its ends to the sheet, and spaced from the free end of the sheet to receive the edge of said map opposite the edge received by the pocket.

6. In a map holder, a casing having a longitudinal slot, a spring-actuated roller therein, a holding sheet secured at one end to said roller, extending through said slot, and adapted to be rolled upon said roller, the free end of said sheet being provided with a pocket adapted to receive an edge of a map, a rod extending transversely of the sheet, secured at its ends to the sheet, and spaced from the free end of the sheet to receive the edge of said map opposite the edge received by the pocket, and binding tapes secured along the side edges of said sheet, and covering the ends of said rod to facilitate its passing through the slot in the casing.

Signed at Sioux City, in the county of Woodbury and State of Iowa, this 27th day of January, 1925.

RALPH J. RICHEY.